United States Patent
Horiuchi et al.

(10) Patent No.: US 6,708,945 B2
(45) Date of Patent: Mar. 23, 2004

(54) FLOW RATE CONTROL VALVE

(75) Inventors: Toru Horiuchi, Higashimurayama (JP); Akio Sato, Soka (JP); Kenji Moriyama, Tsukuba-gun (JP)

(73) Assignee: SMC Kabushiki Kaisha, Tokyo (JP)

( * ) Notice: Subject to any disclaimer, the term of this patent is extended or adjusted under 35 U.S.C. 154(b) by 89 days.

(21) Appl. No.: 10/193,090

(22) Filed: Jul. 12, 2002

(65) Prior Publication Data

US 2003/0010948 A1 Jan. 16, 2003

(30) Foreign Application Priority Data

Jul. 12, 2001 (JP) .................................. 2001-211938

(51) Int. Cl.[7] .............................................. F16K 31/00
(52) U.S. Cl. ...................... 251/11; 251/129.04; 60/513; 60/516
(58) Field of Search ......................... 251/11, 129.04, 251/129.06; 60/513, 576

(56) References Cited

U.S. PATENT DOCUMENTS

| 4,821,997 | A |   | 4/1989  | Zdeblick |         |
|-----------|---|---|---------|----------|---------|
| 4,824,073 | A |   | 4/1989  | Zdeblick |         |
| 5,984,257 | A | * | 11/1999 | Baek et al. | 251/11 |
| 6,158,711 | A | * | 12/2000 | Woo      | 60/513  |
| 6,160,243 | A | * | 12/2000 | Cozad    | 251/11  |

FOREIGN PATENT DOCUMENTS

| JP | 5-233068 | 9/1993  |
|----|----------|---------|
| JP | 8-26886  | 3/1996  |
| JP | 2708395  | 10/1997 |

OTHER PUBLICATIONS

JP 8–26886 is the parent application of Japanese patent document 2708395. The cited U.S. references correspond to these Japanese documents and serve as translations thereof. An English summary of JP 5–233068 is included, as a partial translation thereof.

* cited by examiner

*Primary Examiner*—John Bastianelli
(74) *Attorney, Agent, or Firm*—Paul A. Guss

(57) ABSTRACT

A flow rate control valve includes a second substrate having a flexible thin film and interposed between a first substrate having a heating mechanism and a third substrate having a sealing section. The first substrate and the second substrate close an internal space formed adjacent to the heating mechanism and filled with an expandable material. The sealing section and the flexible thin film function together as a valve. The heating mechanism heats and expands the expandable material whose pressure is detected by pressure-detecting sensors. The detected pressure value is fed back to a control mechanism of the heating mechanism for opening/closing a fluid flow passage and controlling the valve opening degree.

10 Claims, 12 Drawing Sheets

FLOW RATE CONTROL VALVE

BACKGROUND OF THE INVENTION

1. Field of the Invention

The present invention relates to a flow rate control valve capable of opening/closing a fluid circuit and freely adjusting the opening degree thereof by effecting cooperation between an expandable material and a flexible thin film.

2. Description of the Related Art

A flow rate control valve, which is based on the system called "thermal system" or "heat system" and which utilizes a thermally expandable material, has been hitherto widely known. Reference may be made, for example, to Japanese Patent Publication No. 2708395 (U.S. Pat. No. 4,824,073).

As shown in FIG. 11, the conventional flow rate control valve comprises a silicon wafer 8 which has a flexible wall 4, which includes a certain amount of substance 2, and which has a thin film chamber 1 for accommodating the substance 2. The thin film chamber 1 is formed of at least the silicon wafer 8. The thin film chamber 1 serves as a hermetic vessel to capture the substance 2. The flow rate control valve further comprises a pyrex wafer 7 which has a heating means 3 facing the thin film chamber 1. The substance 2 is closed by an epoxy cap 6.

The conventional flow rate control valve has a fluid flow passage 10 including an internal bore which is formed in a pyrex wafer 9 connected to the silicon wafer 8, which is disposed adjacently to the flexible wall 4, and which is constructed so that a fluid to be controlled flows therethrough. The bore is formed by a space between the flexible wall 4 and a sealing surface 5 formed on the pyrex wafer 9. The flow rate of the fluid flowing through the fluid flow passage 10 is controlled by the flexible wall 4 in cooperation with the sealing surface 5.

The heating means 3, which is provided on the pyrex wafer 7, heats the substance 2 so that the bending amount of the flexible wall 4 is controlled to control the cross-sectional area formed by the gap between the flexible wall 4 of the silicon wafer 8 and the sealing surface 5 formed on the pyrex wafer 9. Thus, the flow rate of the fluid flowing through the fluid flow passage 10 is controlled.

Japanese Laid-Open Patent Publication No. 5-233068 discloses a system for controlling the flow rate of a fluid flowing through a flow passage by providing, as means for detecting the flow rate of the fluid, pressure gauges disposed on the outlet of a valve mechanism section of a mass flow controller.

That is, as shown in FIG. 12, a fixed orifice 13 is provided for a gas flow passage 14. A first pressure gauge 15, which measures the pressure by using the change in capacity or volume of a diaphragm that is deformable depending on the change in pressure, is provided for the fixed orifice 13. A second pressure gauge 16 is provided upstream from the fixed orifice 13. The differential pressure between the pressures measured by the first and second pressure gauges 15, 16 is converted into a flow rate which is outputted as a signal.

The output signal (detection signal) is compared with a preset signal by using a comparing circuit 12. A variable valve 17 is controlled by means of a control circuit 11 so that the difference between the output signal and the preset signal is zero to control the flow rate of the fluid flowing through the gas flow passage 14.

According to the technical concept disclosed in Japanese Patent Publication No. 2708395, however, if any deterioration or any time-dependent change is caused, for example, as a result of the use for a long term in the flexible wall 4 and the substance 2 which is expandable by being heated by the heating means 3, then it is impossible to correctly grasp the displacement amounts of the substance 2 and the flexible wall 4, and the controlled flow rate of the fluid becomes unstable.

For this drawback, it is assumed that an unillustrated temperature sensor is provided for the substance 2 and the flexible wall 4 in order that the displacement states of the substance 2 and the flexible wall 4 are grasped to stabilize the flow rate of the fluid and avoid any overheating or any insufficient heating effected by the heating means 3.

However, the temperature sensor is affected by the ambient temperature at which the flow rate control valve is used, and it is impossible to obtain no sufficient accuracy for correctly grasping the displacement amounts of the substance 2 and the flexible wall 4.

According to the technical concept disclosed in Japanese Laid-Open Patent Publication No. 5-233068, the pressure for the flow rate of the fluid is detected by the pair of pressure gauges 15, 16, and the detection signal is fed back to the control circuit 11 for the variable valve 17 to open/close the variable valve 17 and adjust the opening degree thereof in order that the flow rate of the fluid is stabilized. However, the response is slow, and the overshoot or the undershoot is apt to occur, because the feedback loop is large.

SUMMARY OF THE INVENTION

A general object of the present invention is to provide a flow rate control valve capable of improving the response performance for controlling the flow rate of a fluid flowing through a fluid flow passage and the stability of the flow rate of the fluid.

The flow rate control valve according to the present invention comprises at least one pressure-detecting sensor which detects a pressure brought about when an expandable material is expanded by the heating action of a heating mechanism. A control signal is outputted by a control mechanism to the heating mechanism based upon a detection signal derived from the pressure-detecting sensor to adjust the spacing distance between a sealing section and a flexible thin film which is flexibly bendable in cooperation with the expanding action of the expandable material, or adjust the spacing distance between a sealing section and a tiltable member which is tiltable by a flexible thin film which is flexibly bendable in cooperation with the expanding action of the expandable material.

As a result, in the present invention, an obtained feedback loop is smaller than the conventional feedback loop (see FIG. 12). The output response is improved for the control signal controlled by the control mechanism based upon the detection signal. Accordingly, the occurrence of the overshoot or the undershoot is suppressed. Thus, it is possible to further stabilize the flow rate of the fluid flowing through the fluid flow passage.

According to the present invention, the displacement state of the flexible thin film which is flexibly bendable in cooperation with the expandable material is detected by the pressure-detecting sensor in order to avoid the overheating or the insufficient heating of the heating mechanism. Therefore, no influence is exerted by the ambient temperature at which the flow rate control valve is used.

According to the present invention, the time-dependent change and the deterioration state can be also grasped by previously storing, in an unillustrated memory means, the initial value of the pressure brought about when the expandable material is expanded, and comparing the initial value with an actually measured value obtained when the flow rate control valve is used.

According to the present invention, the unillustrated memory means previously stores the flexibly bending displacement amount of the flexible thin film depending on the pressure brought about when the expandable material is expanded and the displacement amount of the tiltable member which is tilted by the flexible thin film. Thus, the self-diagnosis can be made for the positional state of the flexible thin film which is flexibly bent in cooperation with the expandable material and the tiltable member which is tilted by the flexible thin film, regardless of whether or not the fluid flowing through the fluid flow passage exists.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
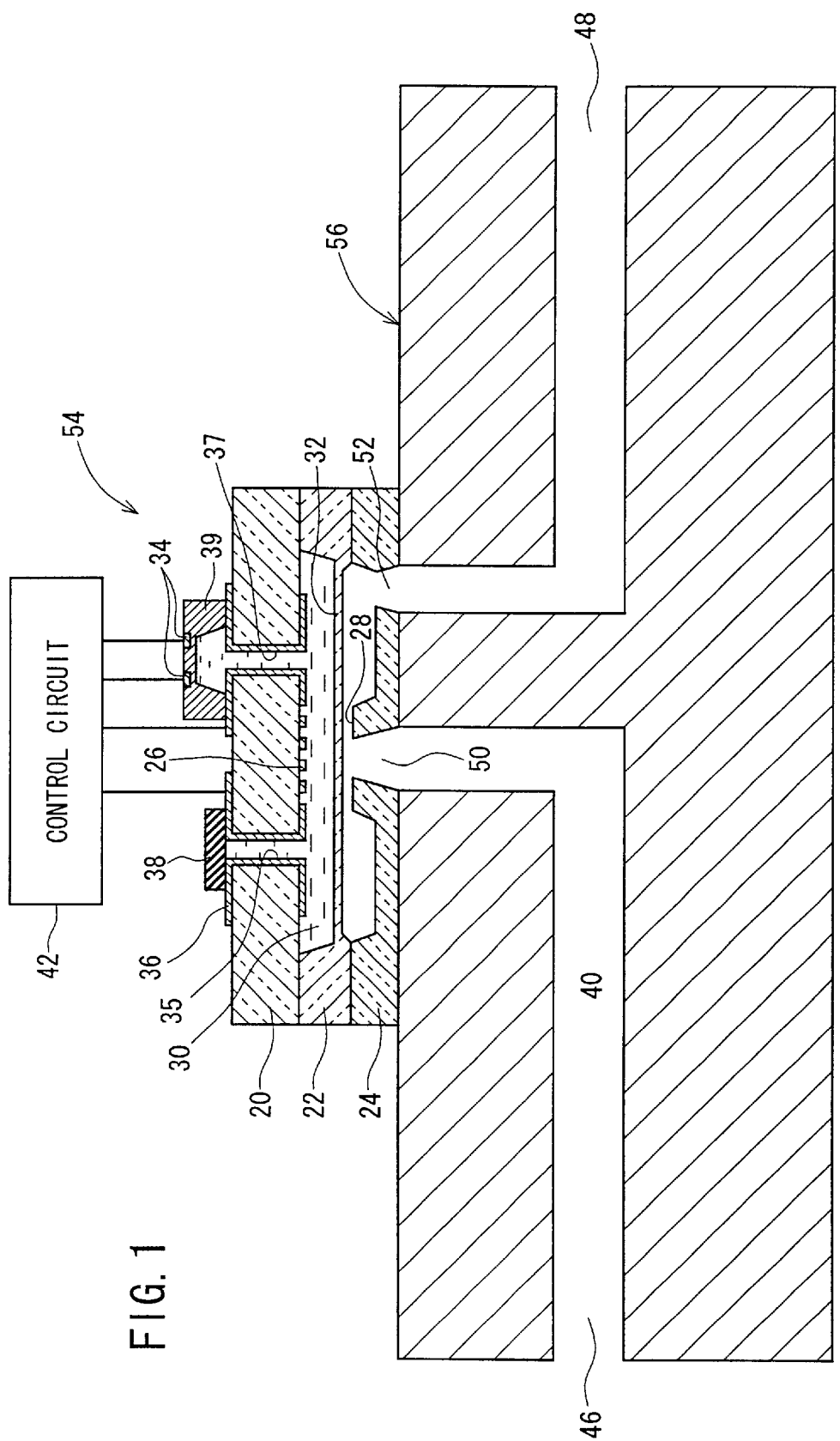
FIG. 1 shows, in longitudinal cross section, a structure illustrating a state in the no electric power-applied situation (in the valve-open situation) of a flow rate control valve of the normally open type according to a first embodiment of the present invention.
Figure 2:
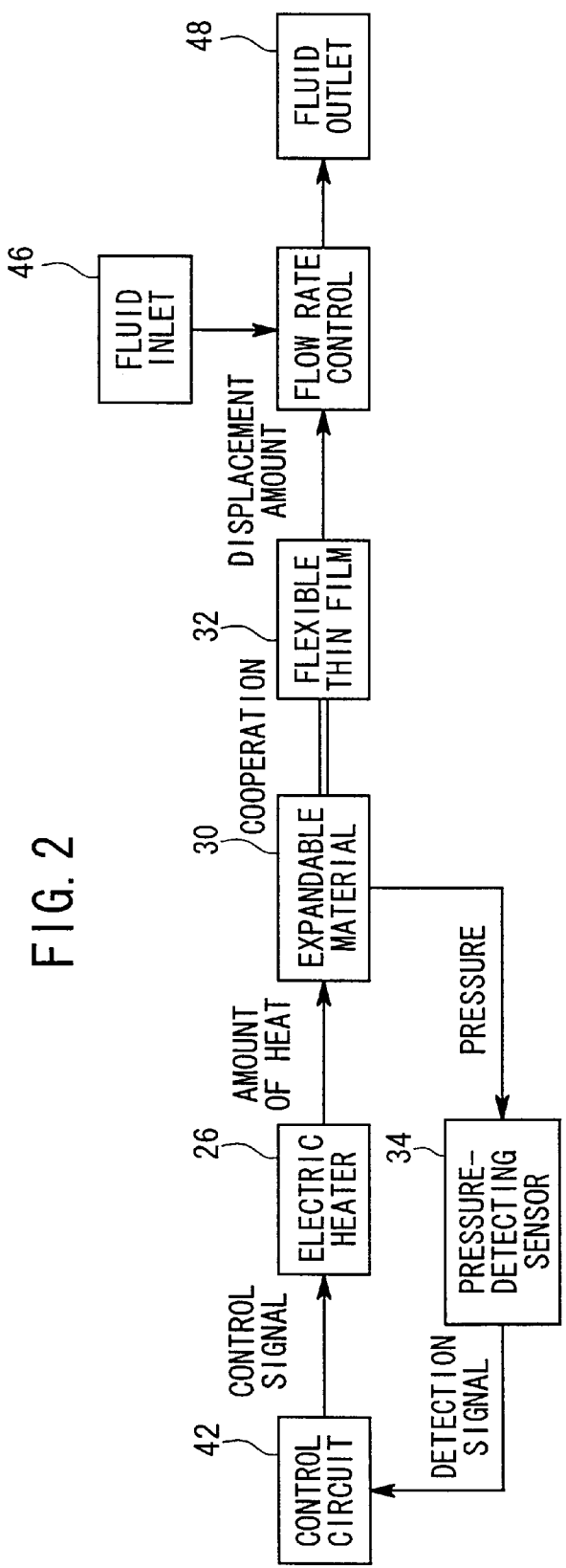
FIG. 2 shows a block diagram illustrating the flow rate control valve of the normally open type shown in FIG. 1.

In FIG. 1, reference numeral 54 indicates a flow rate control valve of a normally open type according to a first embodiment of the present invention.

The flow rate control valve 54 of the normally open type comprises a first substrate 20 having an electrode 36 and an electric heater (heating mechanism) 26 which is connected to the electrode 36. The electrode 36 is electrically connected to a control circuit (control mechanism) 42 of the electric heater 26.

The electric heater 26 is preferably formed of, for example, a platinum resistor. The first substrate 20 is preferably formed of, for example, an insulator or a dielectric such as pyrex glass or a semiconductor such as silicon.

The flow rate control valve 54 further comprises a third substrate 24 having a sealing section 28 serving as a valve seat. The third substrate 24 has an input port 50 and an output port 52 communicating with a fluid flow passage 40 of a base 56. The fluid flow passage 40 extends from a fluid inlet 46 through the base 56 to a fluid outlet 48.

The third substrate 24 is preferably formed of, for example, a semiconductor such as silicon.

The flow rate control valve 54 further comprises a second substrate 22. The first substrate 20 and the second substrate 22 close an internal space filled with an expandable material 30 expandable by the heating action. The internal space is formed adjacent to the electric heater 26. The second substrate 22 has a flexible thin film 32 disposed under the internal space. The sealing section 28 and the flexible thin film 32 function together as a valve. The second substrate 22 is interposed between the first substrate 20 and the third substrate 24.

The flexible thin film 32 is opposed to the sealing section 28 of the third substrate 24. A first hole 35 and a second hole 37, which penetrate through the first substrate 20 and into which the expandable material 30 inflows, are closed by a cap 38 and a sensor casing 39 respectively.

The expandable material 30 is preferably formed of, for example, a fluorine-based inert liquid. The second substrate 22 is preferably formed of, for example, a semiconductor such as silicon in the same manner as the third substrate 24.

A pair of pressure-detecting sensors 34, which detect the pressure of the expandable material 30, are integrally incorporated into a recess disposed at an upper end of the sensor casing 39. The sensor casing 39 is secured by an adhesive to an upper surface of the first substrate 20.

Each of the pressure-detecting sensors 34 includes a thin diaphragm obtained, for example, by processing a semiconductor such as silicon, in which a diffused resistor is formed for the thin diaphragm. The pressure is converted into a detection signal by utilizing the piezoresistance effect in which the change in pressure caused by expansion or contraction is detected as an amount of change in resistance.

The flow rate control valve 54 of the normally open type according to the first embodiment is basically constructed as described above. Next, its operation, function, and effect will be explained.

At first, a desired preset value is inputted by an unillustrated setting means of the control circuit 42. A control signal is outputted to the electrode 36 and the electric heater 26 which is connected to the electrode 36.

The expandable material 30 is expanded by the heating action of the electric heater 26. The flexible thin film 32 is flexibly bent downwardly in cooperation with the expandable material 30 to adjust the spacing distance between the flexible thin film 32 and the sealing section 28 opposed to the flexible thin film 32 so as to open/close the flow passage between the input port 50 and the output port 52 communicating with the fluid flow passage 40 and control the opening degree of the valve.

At this time, the pressure-detecting sensors 34 detect the pressure of the expandable material 30, and the detection signal is derived to the control circuit 42.

A correlation data table, which correlates the flexible bending amount of the flexible thin film 32 corresponding to the pressure value of the expandable material 32, is previously stored in an unillustrated memory means of the control circuit 42. The detection signal is compared with the desired preset value based upon the correlation table to control the control signal outputted to the electric heater 26 so that the difference therebetween is zero.

According to the first embodiment, the flow rate control valve 54 has the pressure-detecting sensors 34 for detecting the pressure brought about when the expandable material 30 is expanded by the heating action of the electric heater 26. The control signal, which is controlled by the control circuit 42 based upon the detection signal derived from the pressure-detecting sensors 34, is outputted to the electric heater 26 to adjust the spacing distance between the sealing section 28 and the flexible thin film 32 which is flexibly bendable in cooperation with the expanding action of the expandable material 30. Therefore, the feedback loop is small, and the output response is improved for the control signal controlled by the control circuit 42 based upon the detection signal. Accordingly, the occurrence of the overshoot or the undershoot is suppressed. Thus, it is possible to further stabilize the flow rate of the fluid flowing between the input port 50 and the output port 52 communicating with the fluid flow passage 40.

FIG. 1 is illustrative of the form in which two of the pressure-detecting sensors 34 for detecting the pressure are provided. However, the number of the pressure-detecting sensor or sensors 34 and/or the attachment position thereof are appropriately selectable depending on, for example, the volume, the shape, and the quality of the expandable material 30 and/or the required performance for adjusting the flow rate.

Figure 3:
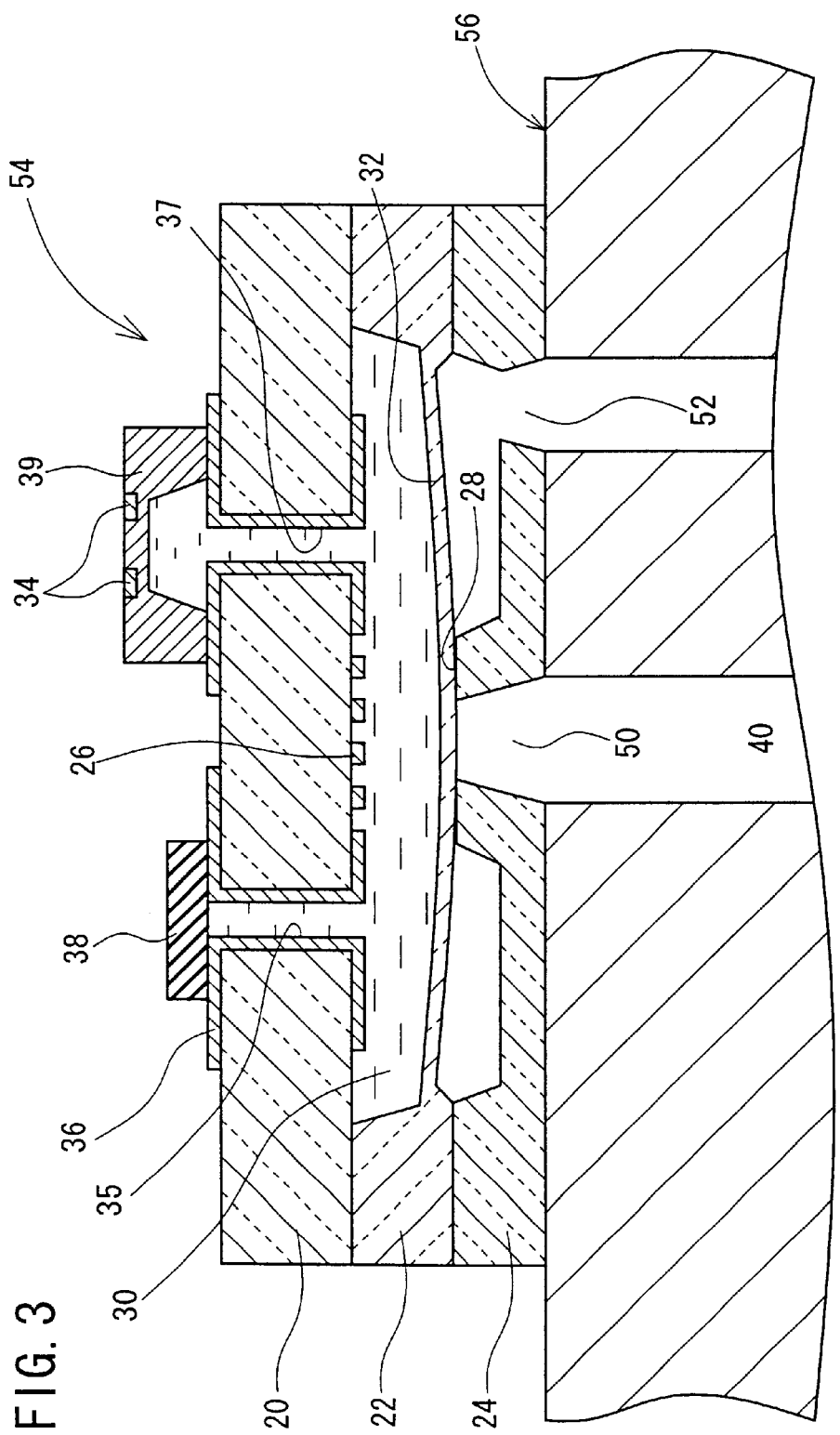
FIG. 3 shows a magnified sectional view of major parts illustrating a state in the electric power-applied situation (in the valve-closed situation) of the flow rate control valve of the normally open type according to the first embodiment of the present invention.

FIG. 1 shows the state in which no electric power is applied to the flow rate control valve of the normally open type. On the other hand, FIG. 3 shows a state in which the electric power is applied, i.e., the valve-closed state in which the flow rate control valve 54 of the normally open type is closed.

Figure 4:
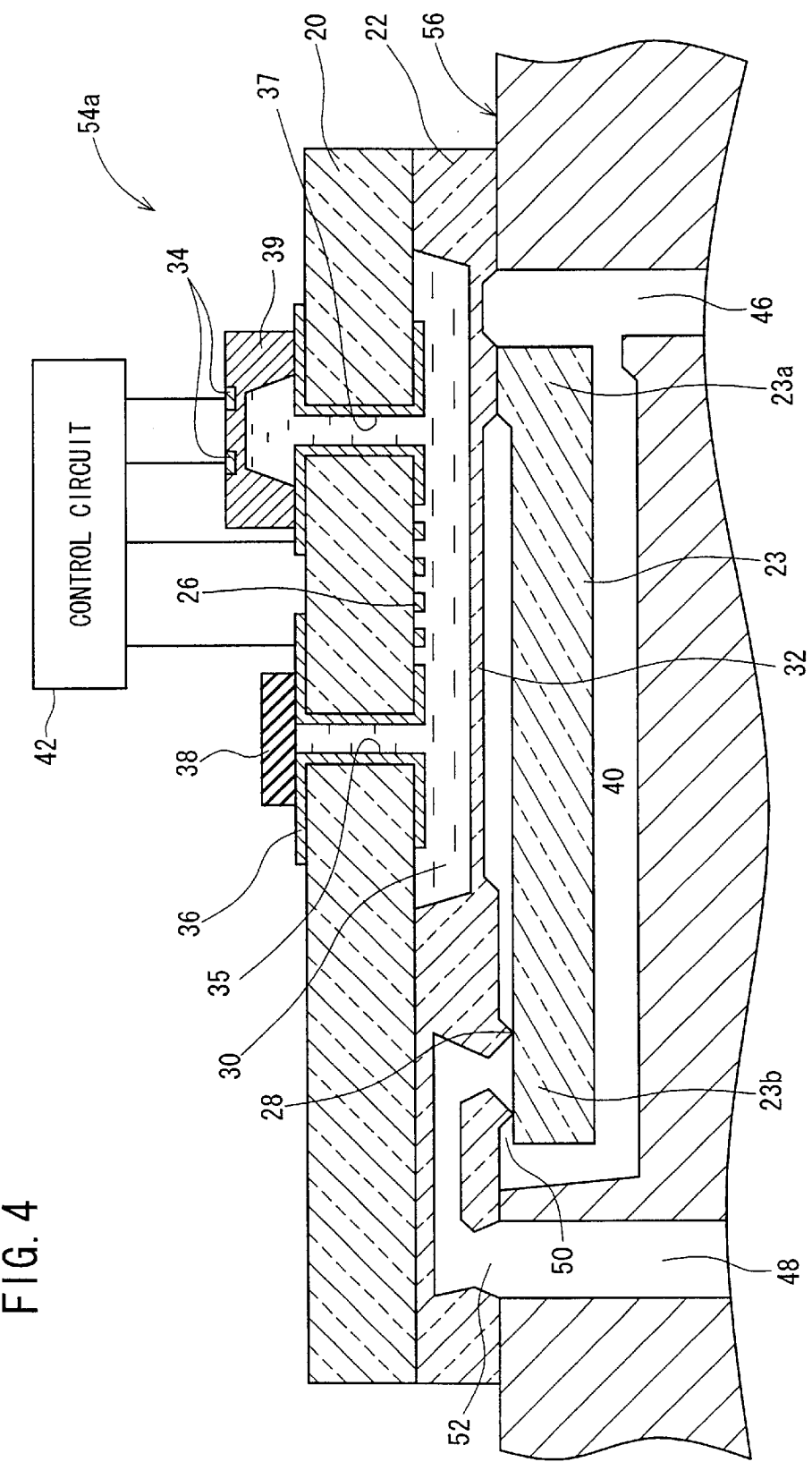
FIG. 4 shows a magnified sectional view of major parts illustrating a state in the no electric power-applied situation (in the valve-closed situation) of a flow rate control valve of the normally closed type according to a second embodiment of the present invention.
Figure 5:
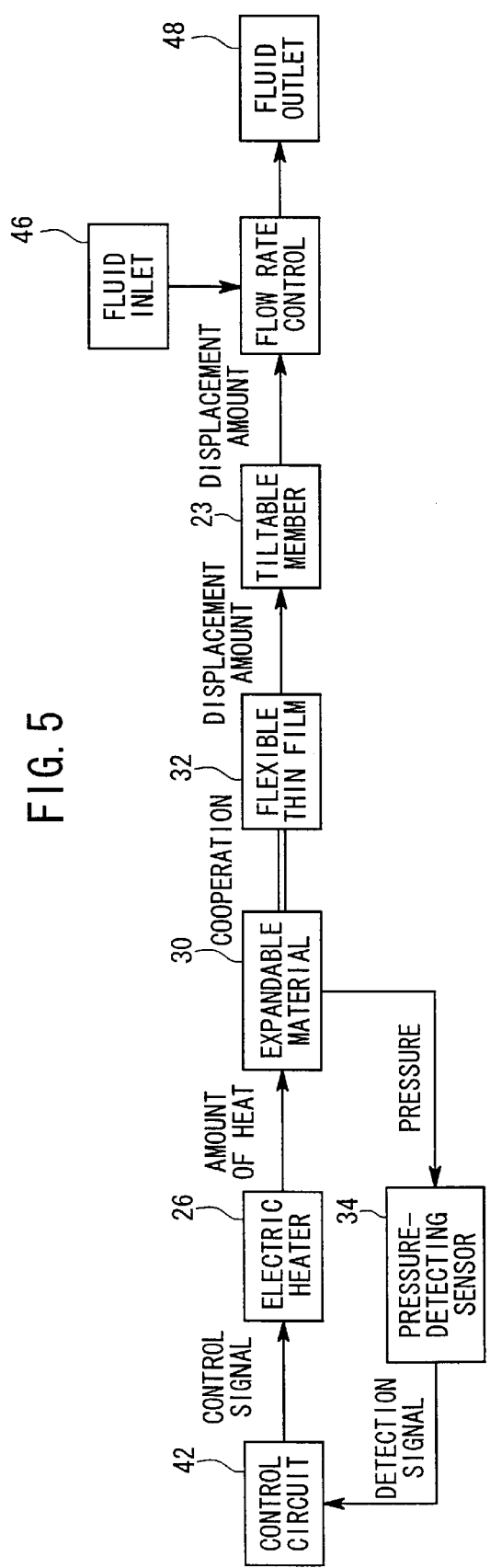
FIG. 5 shows a block diagram illustrating the flow rate control valve of the normally closed type shown in FIG. 4.

Next, FIG. 4 shows a magnified sectional view of major parts illustrating a flow rate control valve 54a of the normally closed type according to a second embodiment of the present invention, and FIG. 5 shows a block diagram illustrating the flow rate control valve of the normally closed type.

In the embodiment described below, the same constitutive components as those of the flow rate control valve 54 of the normally open type shown in FIG. 1 are designated by the same reference numerals, detailed explanation of which will be omitted.

The flow rate control valve 54a of the normally closed type comprises a first substrate 20 having an electrode 36 and an electric heater 26 which is connected to the electrode 36. The electrode 36 is electrically connected to a control circuit 42 for the electric heater 26.

The electric heater 26 is preferably formed of, for example, a platinum resistor. The first substrate 20 is preferably formed of, for example, an insulator or a dielectric such as pyrex glass or a semiconductor such as silicon.

The flow rate control valve 54a further comprises a second substrate 22. The first substrate 20 and the second substrate 22 close an internal space filled with an expandable material 30 expandable by the heating action. The internal space is formed adjacent to the electric heater 26. The second substrate 22 has a flexible thin film 32 which is disposed under the internal space and which is flexibly bendable in cooperation with the expanding action of the expandable material 30. Further, the second substrate 22 has a sealing section 28. The second substrate 22 is interposed between the first substrate 20 and a base 56.

A first hole 35 and a second hole 37 are formed through the first substrate 20, and are closed by a cap 38 and a sensor casing 39 respectively. The first hole 35 and the second hole 37 are filled with the expandable material 30.

The expandable material 30 is preferably formed of, for example, a fluorine-based inert liquid. The second substrate 22 is preferably formed of, for example, a semiconductor such as silicon.

The flow rate control valve 54a further comprises a tiltable member 23. The sealing section 28 and the tiltable member 23 function together as a valve. The tiltable member 23 has its one end 23a which is secured by an adhesive or the like to one side surface of the flexible thin film 32, and it has the other end 23b which confronts and abuts the sealing section 28 so that the valve-closed state is given between an input port 50 and an output port 52 communicating with a fluid flow passage 40 of the base 56 (see FIG. 4).

The tiltable member 23 is preferably formed of, for example, a semiconductor such as silicon. The base is preferably formed of, for example, a metal such as stainless steel or nickel.

Pressure-detecting sensors 34, which detect the pressure of the expandable material 30, are integrally incorporated into a recess disposed at an upper end of the sensor casing 39. The sensor casing 39 is secured by an adhesive to an upper surface of the first substrate 20.

The flow rate control valve 54a of the normally closed type according to the second embodiment is basically constructed as described above. Next, its operation, function, and effect will be explained.

At first, a desired preset value is inputted by an unillustrated setting means of the control circuit 42. A control signal is outputted to the electrode 36 and the electric heater 26 which is connected to the electrode 36.

The expandable material 30 is expanded by the heating action of the electric heater 26. The flexible thin film 32 is flexibly bent downwardly in cooperation with the expandable material 30, and the other end 23b of the tiltable member 23 is slightly tilted about the support point of one end 23a thereof to adjust the spacing distance between the tiltable member 23 and the sealing section 28 opposed to the tiltable member 23 so as to open/close the flow passage between the input port 50 and the output port 52 communicating with the fluid flow passage 40 and control the opening degree of the valve (see FIG. 6).

At this time, the pressure-detecting sensors 34 detect the pressure of the expandable material 30, and the detection signal is derived to the control circuit 42.

A correlation data table, which correlates the flexible bending amount of the flexible thin film 32 corresponding to the pressure value of the expandable material 32 and the displacement amount of the other end 23b of the tiltable member 23 tilted by the flexible thin film 32, is previously stored in an unillustrated memory means of the control circuit 42. The detection signal is compared with the desired preset value based upon the correlation table to control the control signal outputted to the electric heater 26 so that the difference therebetween is zero.

According to the second embodiment, the flow rate control valve 54a has the pressure-detecting sensors 34 for detecting the pressure brought about when the expandable material 30 is expanded by the heating action of the electric heater 26. The control signal, which is controlled by the control circuit 42 based upon the detection signal derived from the pressure-detecting sensors 34, is outputted to the electric heater 26, and the tiltable member 23 is tilted together with the flexible thin film 32 to be flexibly bent in cooperation with the expanding action of the expandable material 30 to adjust the spacing distance between the sealing section 28 and the tiltable member 23. Therefore, the feedback loop is small, and the output response is improved for the control signal controlled by the control circuit 42 based upon the detection signal. Accordingly, the occurrence of the overshoot or the undershoot is suppressed. Thus, it is possible to further stabilize the flow rate of the fluid flowing between the input port 50 and the output port 52 communicating with the fluid flow passage 40.

Figure 6:
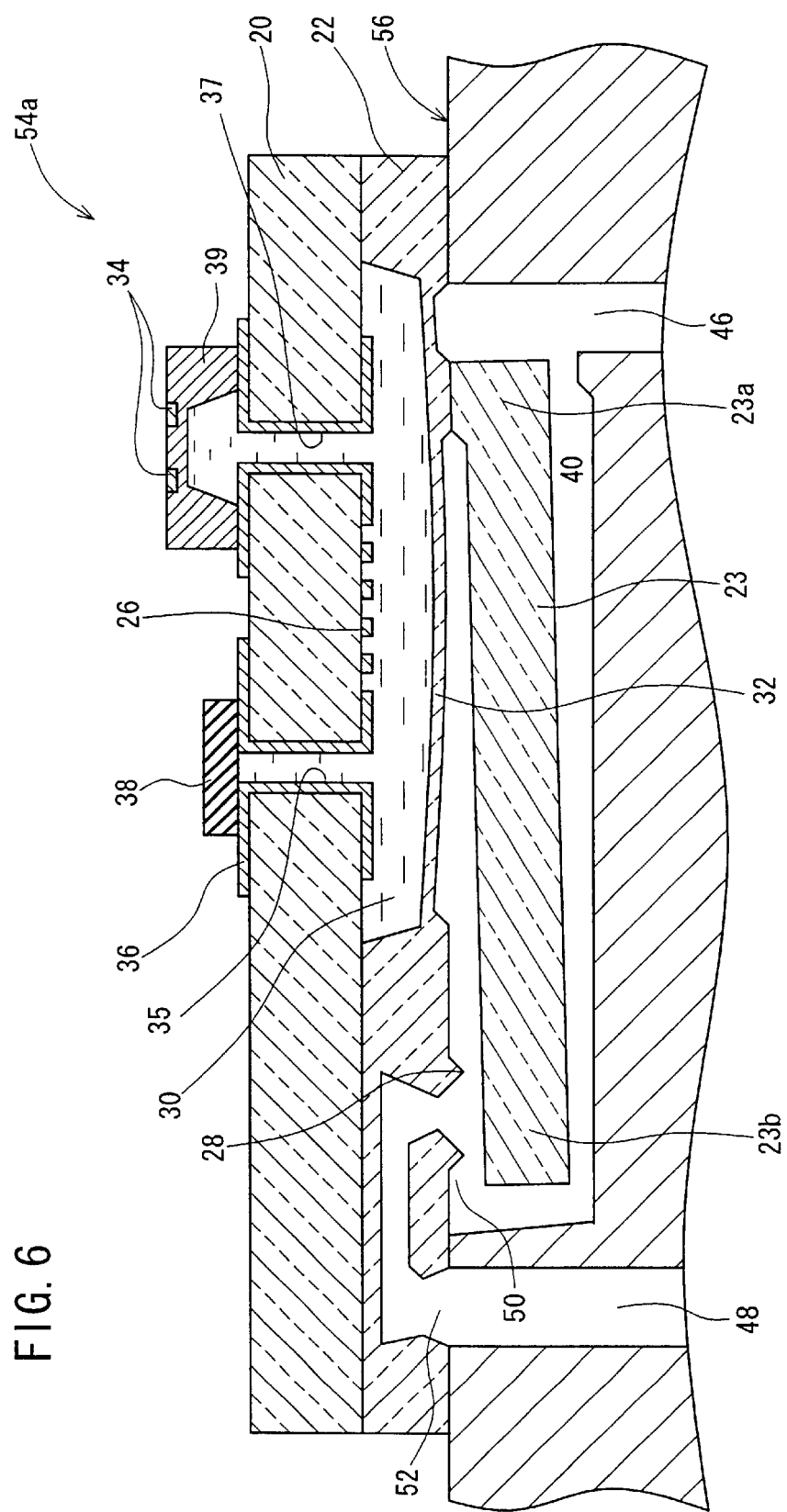
FIG. 6 shows a magnified sectional view of major parts illustrating a state in the electric power-applied situation (in the valve-open situation) of the flow rate control valve of the normally closed type according to the second embodiment of the present invention.

FIG. 4 shows the state in which no electric power is applied to the flow rate control valve 54a of the normally closed type. On the other hand, FIG. 6 shows a state in which the electric power is applied, i.e., the valve-open state in which the flow rate control valve 54a of the normally closed type is opened.

Figure 7:
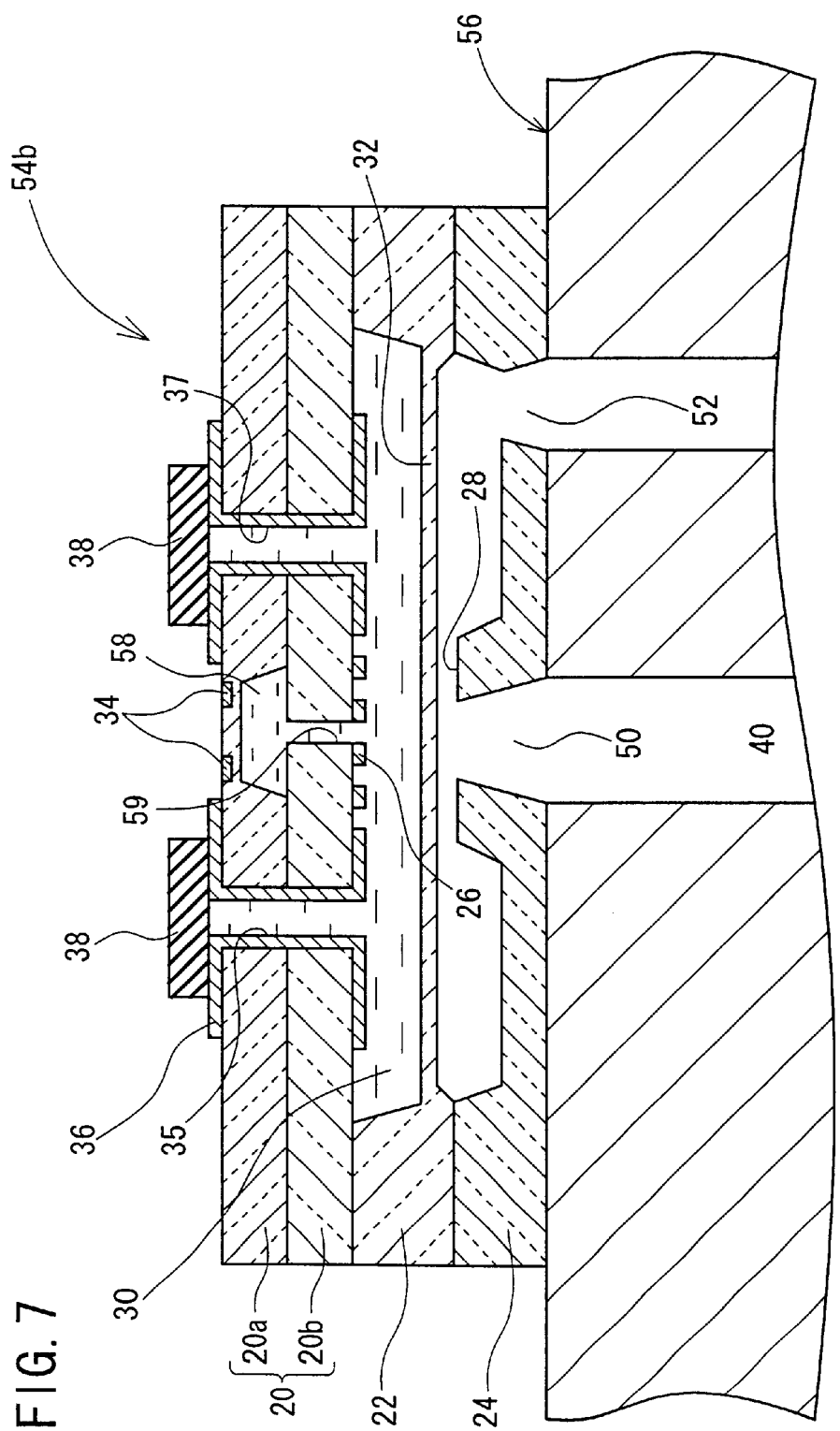
FIG. 7 shows a magnified sectional view of major parts illustrating a modified embodiment of a pressure-detecting sensor-incorporating portion of the flow rate control valve of the normally open type according to the first embodiment of the present invention.

Next, FIG. 7 shows a magnified sectional view of major parts illustrating a flow rate control valve 54b of the normally open type in which the portion for incorporating the pressure-detecting sensors 34 is changed.

The flow rate control valve 54b comprises a first substrate 20 composed of an upper plate 20a and a lower plate 20b which are stuck to one another and integrated into one unit. An expandable material chamber 58 is provided in the upper plate 20a. An introducing hole 59 is formed through the lower plate 20b and introduces the expandable material 30 into the expandable material chamber 58.

A pair of pressure-detecting sensors 34, which detect the pressure of the expandable material 30, are integrally incorporated into a recess disposed at an upper end of the upper plate 20a of the first substrate 20. A detection signal obtained by the pressure-detecting sensors 34 is derived to a control circuit 42.

The flow rate control valve 54b shown in FIG. 7 can be adopted, for example, when it is difficult to provide the sensor casing 39 (see FIG. 1) having the pressure-detecting sensors 34 provided at the portion of the cap 38, or when the portion of the cap 38 is used for another purpose of use, for example, when a boiler is installed near the cap.

In this arrangement, each of the upper plate 20a and the lower plate 20b of the first substrate 20 is preferably formed of, for example, a semiconductor such as silicon, which is formed, for example, from a silicon wafer by means of the micromachining or the like.

Figure 8:
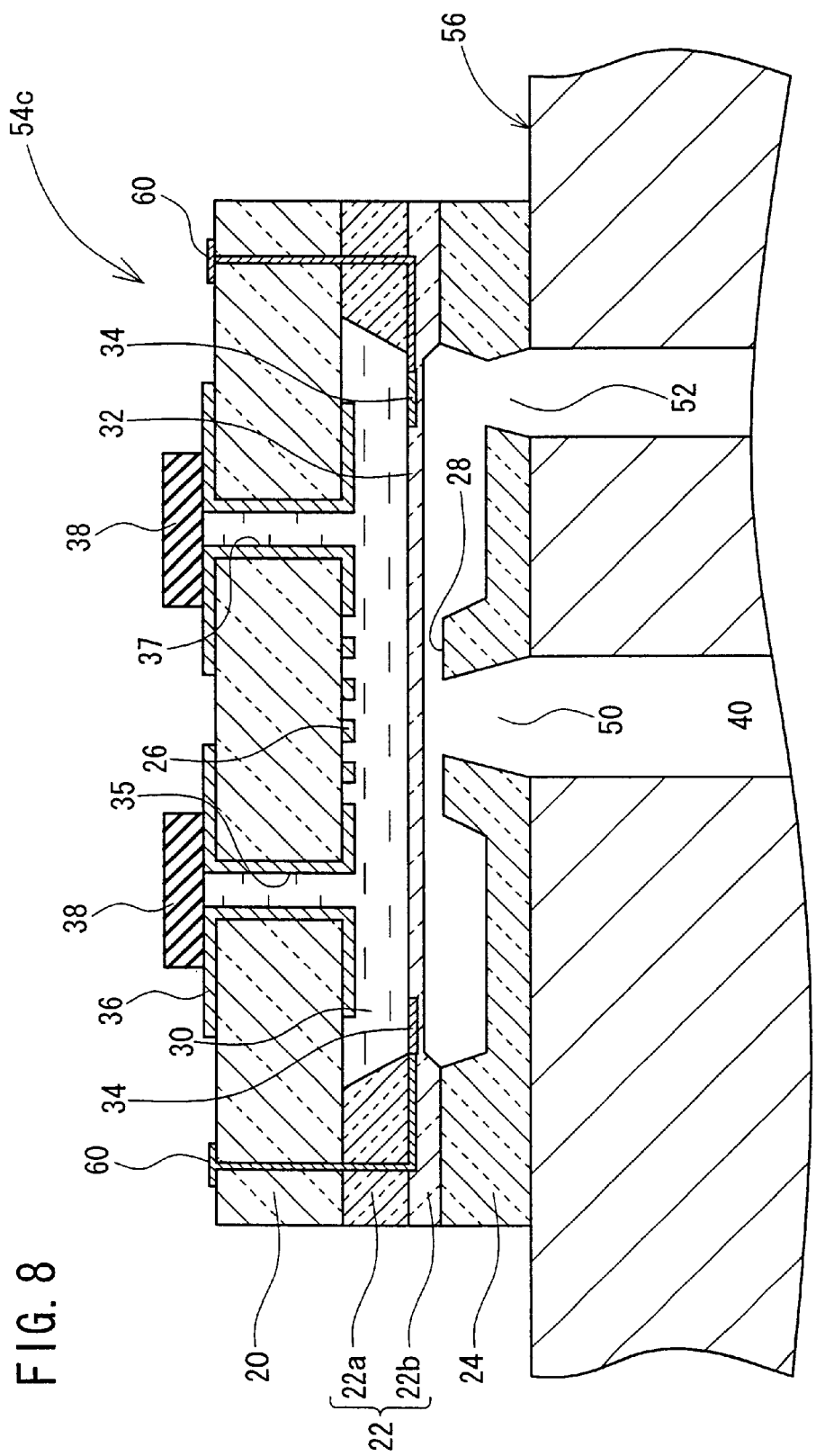
FIG. 8 shows a magnified sectional view of major parts illustrating another modified embodiment of the pressure-detecting sensor-incorporating portion of the flow rate control valve of the normally open type according to the first embodiment of the present invention.

Further, FIG. 8 shows a magnified sectional view of major parts illustrating a flow rate control valve 54c of the normally open type in which the portion for incorporating the pressure-detecting sensors 34 is changed in another way.

The flow rate control valve 54c comprises a second substrate 22 composed of an upper plate 22a and a lower plate 22b which are stuck to one another and integrated into one unit. The first substrate 20, the upper plate 22a and the lower plate 22b close an internal space filled with an expandable material 30. The lower plate 22b has a flexible thin film 32.

A pair of pressure-detecting sensors 34, which detect the pressure of the expandable material 30, are integrally incorporated into recesses formed on one surface of the flexible thin film 32 contacting the expandable material 30. A detection signal obtained by the pressure-detecting sensors 34 is derived to a control circuit 42 by using a pair of penetrating electrodes 60 which penetrate from the upper end surface of the first substrate 20 through the first substrate 20 and the upper plate 22a of the second substrate 22 and which are provided for the flexible thin film 32 along the lower plate 22b.

FIGS. 7 and 8 are illustrative of the modified embodiments in which the portion for incorporating the pressure-detecting sensors 34 is changed based upon the flow rate control valves 54b, 54c of the normally open type. However, modified embodiments, in which the portion for incorporating the pressure-detecting sensors 34 is changed, are also applicable to the flow rate control valve 54a of the normally closed type.

Figure 9:
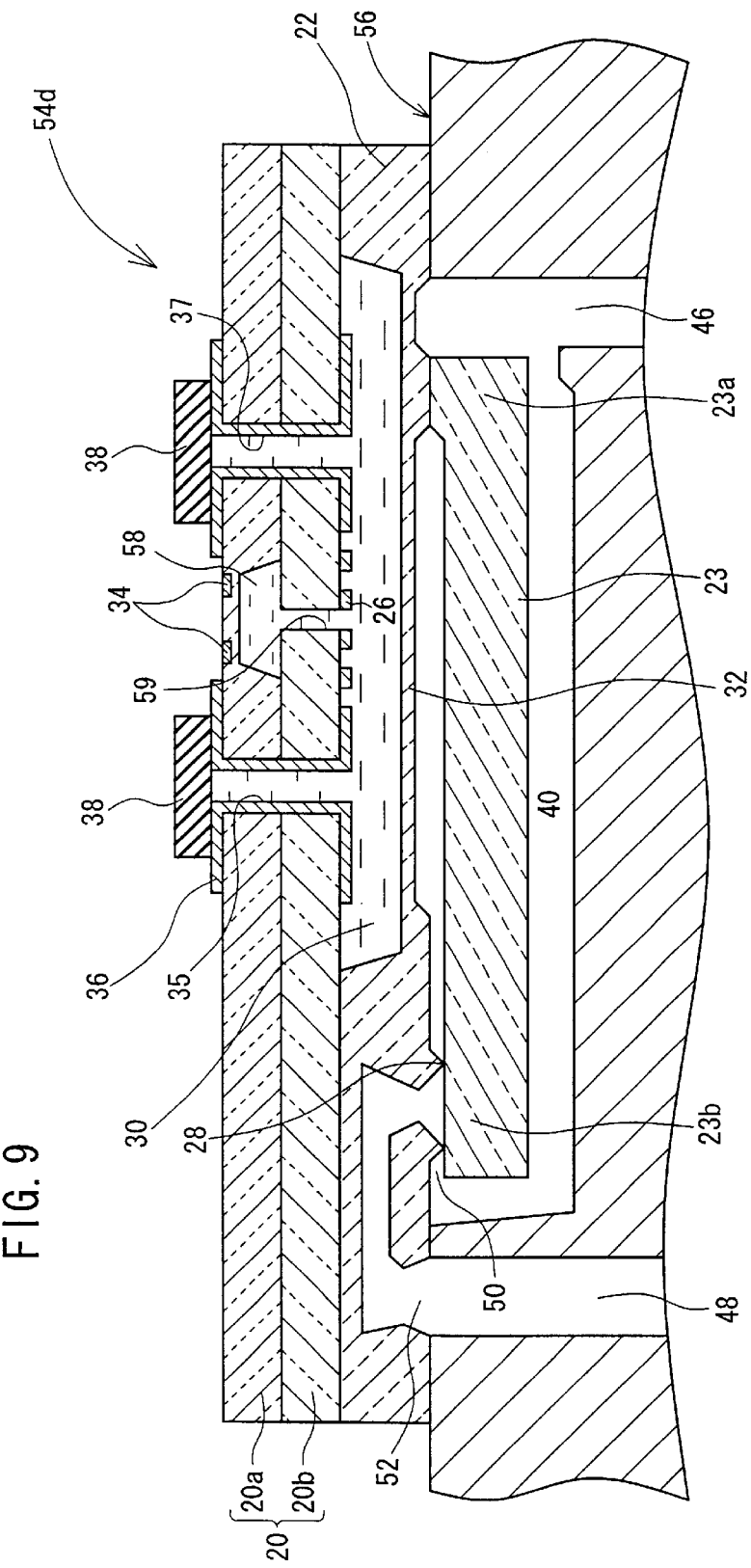
FIG. 9 shows a magnified sectional view of major parts illustrating a modified embodiment of a pressure-detecting sensor-incorporating portion of the flow rate control valve of the normally closed type according to the second embodiment of the present invention.
Figure 10:
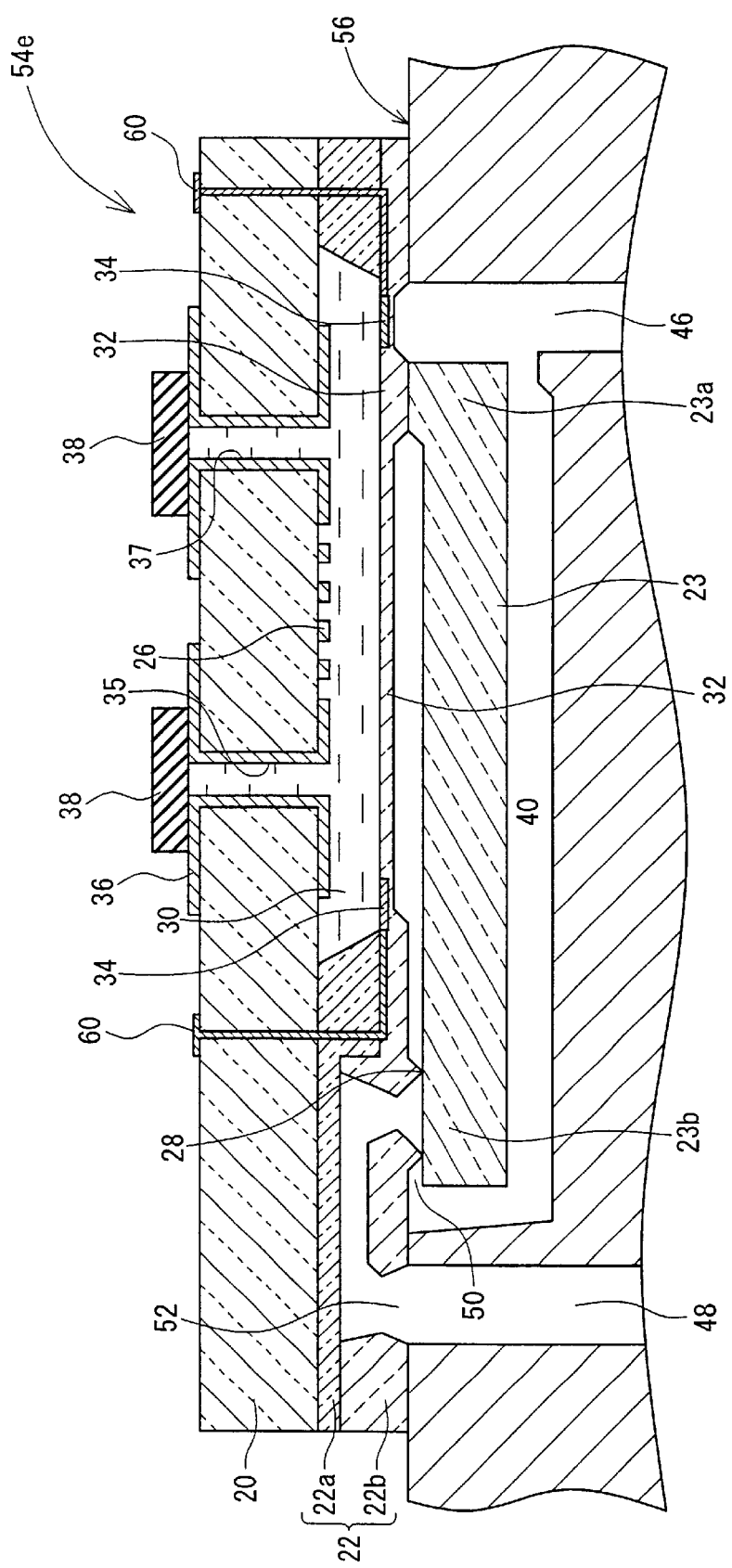
FIG. 10 shows a magnified sectional view of major parts illustrating another modified embodiment of the pressure-detecting sensor-incorporating portion of the flow rate control valve of the normally closed type according to the second embodiment of the present invention.
Figure 11:
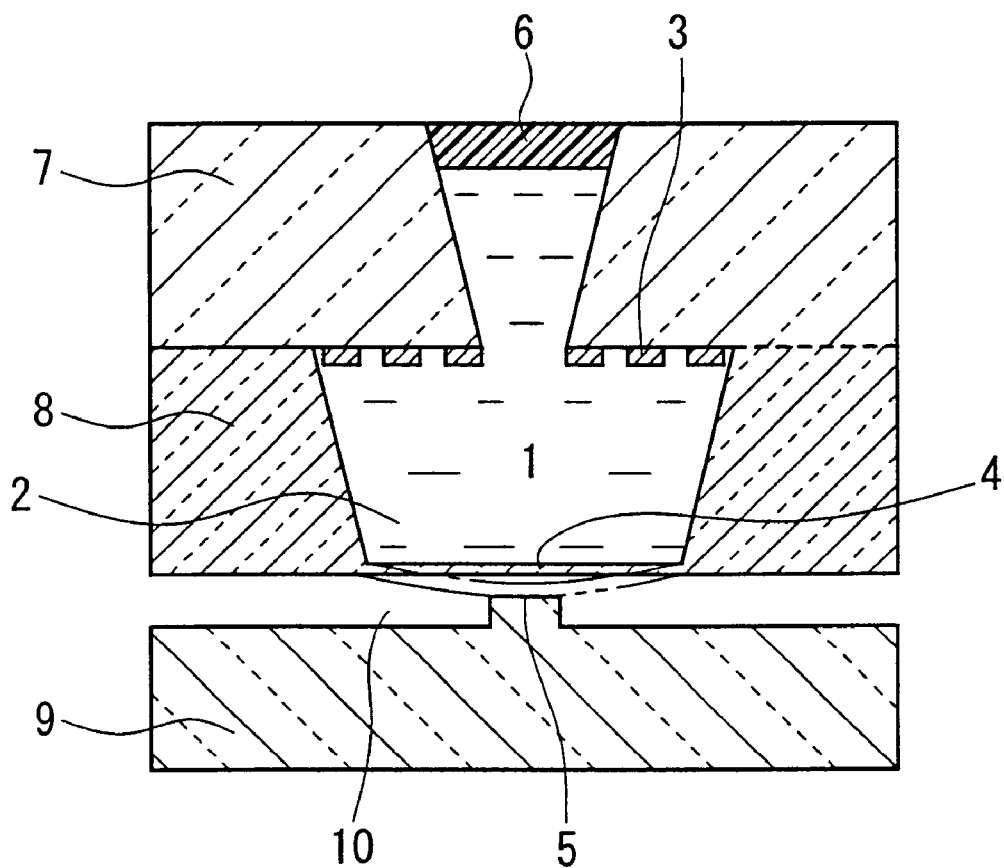
FIG. 11 shows a sectional view illustrating a partial structure of a conventional flow rate control valve.
Figure 12:
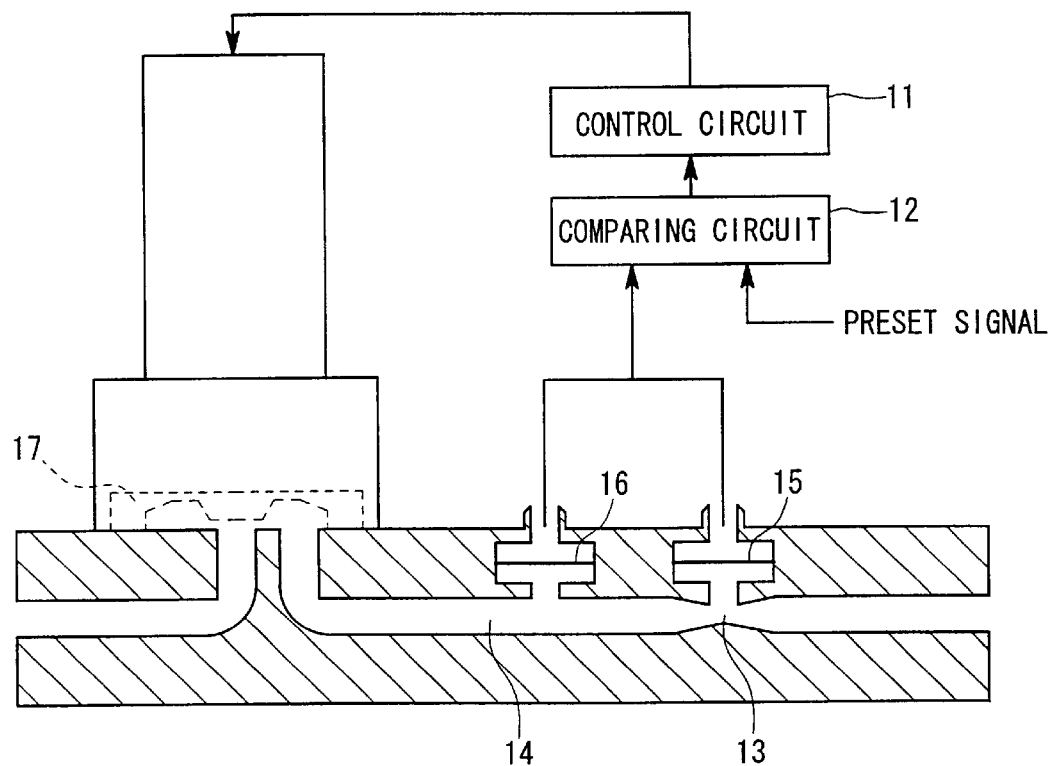
FIG. 12 shows a sectional view illustrating a structure of a conventional mass flow controller.

That is, FIG. 9 shows a flow rate control valve 54d of the normally closed type in which a pair of pressure-detecting sensors 34 for detecting the pressure of an expandable material 30 are integrally incorporated into a recess disposed at an upper end of an upper plate 20a of a first substrate 20. FIG. 10 shows a flow rate control valve 54e of the normally closed type in which a pair of pressure-detecting sensors 34 for detecting the pressure of an expandable material 30 are integrally incorporated into recesses on one surface of a flexible thin film 32 contacting the expandable material 30. In this arrangement, a pair of penetrating electrodes 60, which penetrate from the upper end surface of a first substrate 20 through the first substrate 20 and an upper plate 22a of a second substrate 22 and which are continued to the flexible thin film 32 along a lower plate 22b, are provided in order that the detection signal obtained by the pressure-detecting sensors 34 is derived to a control circuit 42.

As described above, according to the embodiment of the present invention, the pressure-detecting sensors 34, which detect the pressure brought about when the expandable material 30 is expanded by the heating action of the electric heater 26, are provided. The control signal, which is controlled by the control circuit 42 based upon the detection signal derived from the pressure-detecting sensors 34, is outputted to the electric heater 26 to adjust the spacing distance between the sealing section 28 and the flexible thin film 32 which is flexibly bendable in cooperation with the expanding action of the expandable material 30, or adjust the spacing distance between the sealing section 28 and the tiltable member 23 which is tilted by the flexible thin film 32 that is flexibly bendable in cooperation with the expanding action of the expandable material 30. Therefore, the feedback loop is small, and the output response is improved for the control signal controlled by the control circuit 42 based upon the detection signal. Accordingly, the occurrence of the overshoot or the undershoot is suppressed, and thus it is possible to further stabilize the flow rate of the fluid flowing between the input port 50 and the output port 52 communicating with the fluid flow passage 40.

Further, the displacement state of the flexible thin film 32 which is flexibly bendable in cooperation with the expandable material 30 is detected by the pressure-detecting sensors 34 in order to avoid the overheating or the insufficient heating of the electric heater 26. Therefore, no influence is exerted by the ambient temperature at which any one of the flow rate control valves 54, 54a, 54b, 54c is used.

Further, the time-dependent change and the deterioration state can be also grasped by previously storing, in the unillustrated memory means, the initial value of the pressure brought about when the expandable material 30 is expanded, and comparing the initial value with an actually measured value obtained when any one of the flow rate control valves 54, 54a, 54b, 54c is used.

Further, the unillustrated memory means previously stores the flexibly bending displacement amount of the flexible thin film 32 depending on the pressure brought about when the expandable material 30 is expanded and the displacement amount of the tiltable member 23 which is tilted by the flexible thin film 32. Thus, the self-diagnosis can be made for the positional state of the flexible thin film 32 which is flexibly bent in cooperation with the expandable material 30 and the tiltable member 23 which is tilted by the flexible thin film 32, regardless of whether or not the fluid between the input port 50 and the output port 52 communicating with the fluid flow passage 40 exists.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A flow rate control valve comprising:
   a first substrate having an electrode and a heating mechanism connected to said electrode;
   a second substrate having a flexible thin film flexibly bent by an expanding action of an expandable material expanded by a heating action of said heating mechanism, said first substrate and said second substrate closing an internal space filled with said expandable material;
   a third substrate having a sealing section confronting said flexible thin film, said second substrate being interposed between said first substrate and said third substrate;
   at least one pressure-detecting sensor detecting a pressure of said expandable material expanded by the heating action of said heating mechanism; and
   a control mechanism adjusting a spacing distance between said flexible thin film and said sealing section based upon a detection signal derived from said pressure-detecting sensor when said flexible thin film is flexibly bent by the expanding action of said expandable material.

2. The flow rate control valve according to claim 1, wherein said pressure-detecting sensor is an element using a piezoresistance effect.

3. The flow rate control valve according to claim 2, wherein said pressure-detecting sensor is integrally disposed into a recess formed at an upper end of a casing secured to an upper surface of said first substrate.

4. The flow rate control valve according to claim 2, wherein said pressure-detecting sensor is integrally disposed into a recess formed on an outer side surface of said first substrate.

5. The flow rate control valve according to claim 2, wherein said pressure-detecting sensor is integrally disposed into a recess formed on an outer side surface of said flexible thin film facing said expandable material.

6. A flow rate control valve comprising:
   a first substrate having an electrode and a heating mechanism connected to said electrode;
   a second substrate having a sealing section and a flexible thin film which is flexibly bent by an expanding action of an expandable material expanded by a heating action of said heating mechanism, said first substrate and said second substrate closing an internal space filled with said expandable material;
   a tiltable member confronting said sealing section and secured to said second substrate, said tiltable member having an end and another end which is displaced about a support point of said end;
   at least one pressure-detecting sensor detecting a pressure of said expandable material expanded by the heating action of said heating mechanism; and
   a control mechanism adjusting a spacing distance between said sealing section and said tiltable member based on a detection signal derived from said pressure-detecting sensor when said flexible thin film is flexibly bent by the expanding action of said expandable material.

7. The flow rate control valve according to claim 6, wherein said pressure-detecting sensor is an element using a piezoresistance effect.

8. The flow rate control valve according to claim 7, wherein said pressure-detecting sensor is integrally disposed into a recess formed at an upper end of a casing secured to an upper surface of said first substrate.

9. The flow rate control valve according to claim 7, wherein said pressure-detecting sensor is integrally disposed into a recess formed on an outer side surface of said first substrate.

10. The flow rate control valve according to claim 7, wherein said pressure-detecting sensor is integrally disposed into a recess formed on an outer side surface of said flexible thin film facing said expandable material.

* * * * *